(12) United States Patent
Paczkowski

(10) Patent No.: US 12,355,892 B2
(45) Date of Patent: Jul. 8, 2025

(54) WIRELESS COMMUNICATION NETWORK SERVICE USING AN APPLICATION PROGRAMMING INTERFACE (API) AND DISTRIBUTED LEDGER

(71) Applicant: T-Mobile Innovations LLC, Overland Park, KS (US)

(72) Inventor: Lyle Walter Paczkowski, Mission Hills, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 522 days.

(21) Appl. No.: 17/545,551

(22) Filed: Dec. 8, 2021

(65) Prior Publication Data

US 2023/0318842 A1    Oct. 5, 2023

(51) Int. Cl.
*H04L 9/32* (2006.01)
*H04W 12/06* (2021.01)
*H04W 48/08* (2009.01)
*H04L 9/00* (2022.01)

(52) U.S. Cl.
CPC ........... *H04L 9/3239* (2013.01); *H04W 12/06* (2013.01); *H04W 48/08* (2013.01); *H04L 9/50* (2022.05)

(58) Field of Classification Search
CPC ..... H04L 9/3239; H04L 9/50; H04L 2209/80; H04W 12/06; H04W 48/08; H04W 84/042
See application file for complete search history.

(56) References Cited

U.S. PATENT DOCUMENTS

| | | |
|---|---|---|
| 10,673,618 B2 | 6/2020 | Suthar et al. |
| 10,901,957 B2 | 1/2021 | Natarajan et al. |
| 2011/0218891 A1* | 9/2011 | Sjelvgren ............... G06Q 40/12 705/30 |
| 2017/0367026 A1* | 12/2017 | Li .......................... H04L 63/102 |
| 2019/0037401 A1 | 1/2019 | Egner et al. |
| 2019/0044703 A1 | 2/2019 | Smith |
| 2019/0147431 A1* | 5/2019 | Galebach ............... H04L 9/3247 705/44 |
| 2019/0190719 A1 | 6/2019 | van de Ruit et al. |
| 2019/0373472 A1 | 12/2019 | Smith et al. |
| 2023/0327879 A1* | 10/2023 | Fabjanski ............... G06F 21/54 713/176 |

* cited by examiner

*Primary Examiner* — Henry Tsang
*Assistant Examiner* — Suman Debnath

(57) ABSTRACT

In a wireless communication network, an Application Function (AF) exposes an Application Programming Interface (API) for User Equipment (UE) information, and in response, receives API calls from an external data system. The AF transfers API responses to the external data system. The AF transfers API usage data to distributed ledger circuitry. The distributed ledger circuitry stores the API usage data in data blocks that form a blockchain. The distributed ledger circuitry terminates the blockchain, and in response, transfers a terminating data block for delivery to a network data system. The network data system generates an API charge based on the AF API usage data in the terminating data block.

20 Claims, 9 Drawing Sheets

WIRELESS COMMUNICATION NETWORK SERVICE USING AN APPLICATION PROGRAMMING INTERFACE (API) AND DISTRIBUTED LEDGER

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores.

The wireless network elements comprise Access and Mobility Management Functions (AMFs), Network Exposure Functions (NEFs), Application Functions (AFs), User Plane Functions (UPFs), and the like. The NEFs interact with various network elements to collect information about the wireless user devices and to control services that are delivered to the wireless user devices. The NEFs expose an Application Programming Interface (API) to the AFs that allow the AFs to collect the information about the wireless user devices and to control the services that are delivered to the wireless user devices. Likewise, the AFs expose APIs to external Application Servers (AS) to serve the information about the wireless user devices and to receive control instructions for the services that are delivered to the wireless user devices.

In a distributed ledger, a blockchain comprises a series of data blocks that store transactional information like account balances and title ownership. The blockchain is hosted by multiple geo-diverse ledger nodes that each execute a replicated contract to store identical contract results in redundant data blocks. The redundant data blocks in the blockchain are linked to one another because each data block stores a hash of the previous data block. Unfortunately, blockchains are not effectively integrated within the wireless communication networks. Moreover, the AFs in the wireless communication networks do not efficiently support their APIs with blockchains.

TECHNICAL OVERVIEW

In a wireless communication network, an Application Function (AF) exposes an Application Programming Interface (API) for User Equipment (UE) information, and in response, receives API calls from an external data system. The AF transfers API responses to the external data system. The AF transfers API usage data to distributed ledger circuitry. The distributed ledger circuitry stores the API usage data in data blocks that form a blockchain. The distributed ledger circuitry terminates the blockchain, and in response, transfers a terminating data block for delivery to a network data system. The network data system generates an API charge based on the AF API usage data in the terminating data block.

DETAILED DESCRIPTION

Figure 1:
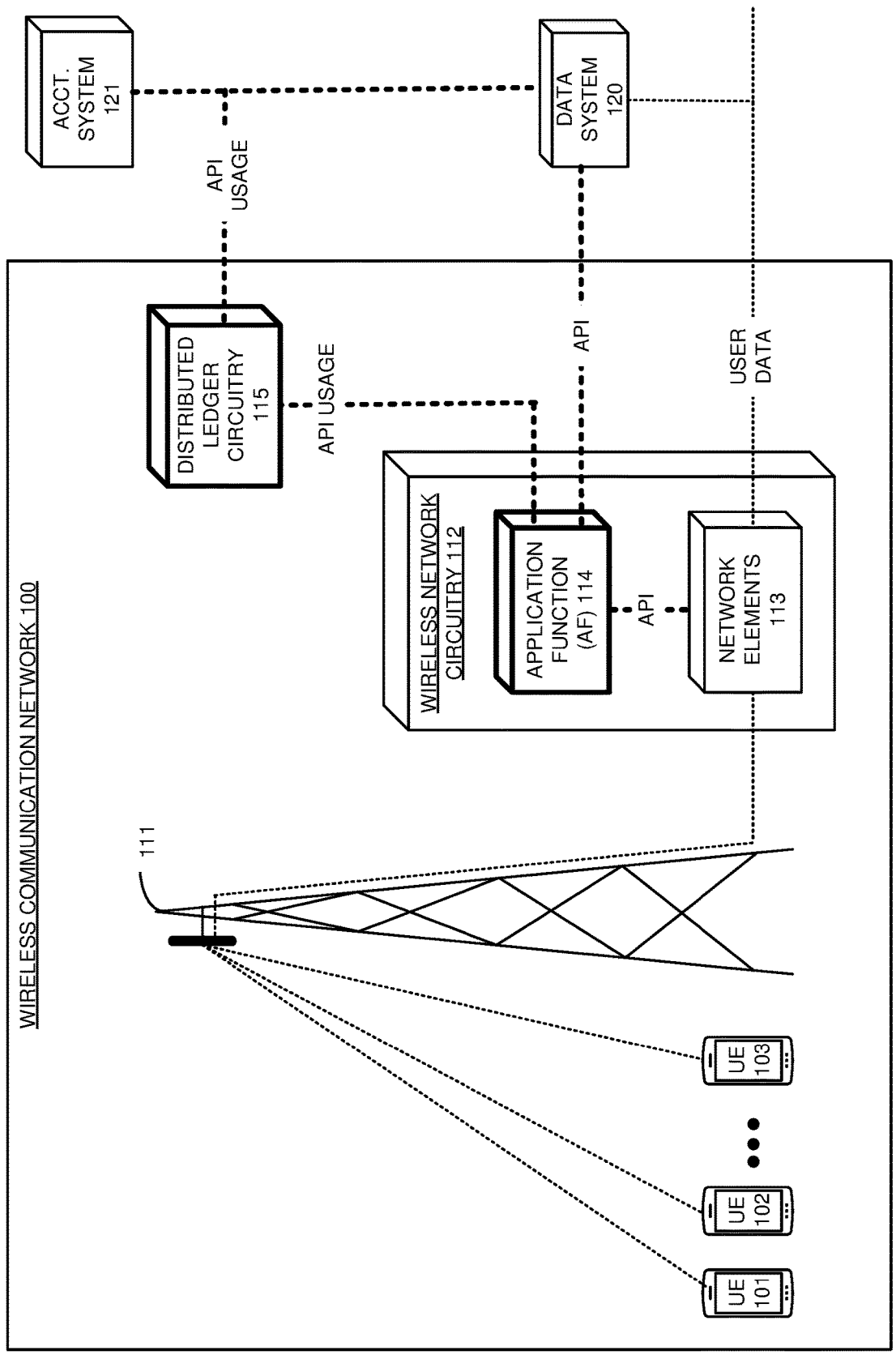
FIG. 1 illustrates an exemplary wireless communication network to serve wireless User Equipment (UEs) over an Application Programming Interface (API) and a distributed ledger.

FIG. 1 illustrates exemplary wireless communication network 100 to serve wireless User Equipment (UEs) 101-103 over an Application Programming Interface (API) and distributed ledger circuitry 115. Wireless communication network 100 comprises UEs 101-103, wireless access node 111, wireless network circuitry 112, and distributed ledger circuitry 115. Wireless network circuitry 112 comprises network elements 113 and Application Function (AF) 114. UEs 101-103 comprise computers, phones, vehicles, sensors, robots, or some other data appliance with data communication circuitry. Exemplary wireless data services include machine-control, internet-access, media-streaming, social-networking, and/or some other networking product. Wireless communication network 100 is simplified for clarity and typically includes more UEs and access nodes than shown.

Various examples of network operation and configuration are described herein. In some examples, AF 114 exposes an AF API for at least one of UEs 101-103 to data system 120. The AF API comprises API calls for UE location, UE authentication, UE data rate increase, UE data rate decrease, and/or the like. The AF API comprises API responses that indicate UE location, UE authentication, UE data rate increase, UE data rate decrease, and/or the like. In response to the exposed API, AF 114 receives AF API calls from data system 120 and transfers AF API responses to data system 120. AF 114 also transfers AF API usage data to distributed ledger circuitry 115. The API usage data characterizes the API calls and responses by identifier, date, time, result, and possibly other metadata. Distributed ledger circuitry 115 receives and stores the AF API usage data in data blocks that form a blockchain. Distributed ledger circuitry 115 eventually terminates the blockchain and transfers the terminating data block to accounting system 121. The terminating data block typically has recent API usage data and a hash of past API usage data from previous blocks. Accounting system 121 generates an API charge based on the AF API usage data in the terminating data block. For example, a Charging Function (CHF) may assess monetary amounts for each API call and response based on call type, date, and time according to a data structure that correlates the monetary amounts with the API call types, dates, and times.

In some examples, AF 114 receives the AF API calls and responsively transfers corresponding Network Exposure Function (NEF) API calls to a NEF in network elements 113. The NEF generates and transfers corresponding NEF API responses to AF 114, and AF 114 generates the AF API responses based on the NEF API responses. For example, AF 114 may obtain UE 101 location information from a NEF. AF 114 transfers NEF API usage data to distributed ledger circuitry 115. Distributed ledger circuitry 115 stores the NEF API usage data along with the AF API usage data in the data blocks that form the blockchain. Accounting system 121 may generate the charge amount based on the AF API usage data and the NEF API usage data from the terminating data block of the blockchain. In some examples, an early one of the AF API calls comprises a request to initiate the blockchain and an early one of the AF API responses comprises an indication of the initiation of the blockchain. The blockchain could be exposed to the data system 120 and/or accounting system 121. One of the later AF API calls comprises a request to terminate the blockchain, and one of the later AF API responses comprises an indication of the termination of the blockchain.

Advantageously, blockchains are effectively integrated within wireless communication network 100. Moreover, AF 114 efficiently supports its APIs with blockchains in distributed ledger circuitry 115.

UEs 101-103 and wireless access node 111 communicate over wireless links that use wireless technologies like Fifth Generation New Radio (5GNR), Long Term Evolution (LTE), Institute of Electrical and Electronic Engineers (IEEE) 802.11 (WIFI), Low-Power Wide Area Network (LP-WAN), Bluetooth, and/or some other wireless communication protocols. Wireless access node 111, circuitry 112 and 114, and external systems 120-121 communicate over network connections that comprise metallic wiring, glass fibers, radio channels, or some other communication media. The network connections use technologies like IEEE 802.3 (ETHERNET), Internet Protocol (IP), Time Division Multiplex (TDM), Data Over Cable System Interface Specification (DOCSIS), General Packet Radio Service Transfer Protocol (GTP), 5GNR, LTE, WIFI, LP-WAN, Bluetooth, virtual switching, inter-processor communication, bus interfaces, and/or some other data communication protocols. UEs 101-103 and wireless access node 111 include radios. UEs 101-103, wireless access node 111, network circuitry 112, and ledger circuitry 115 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
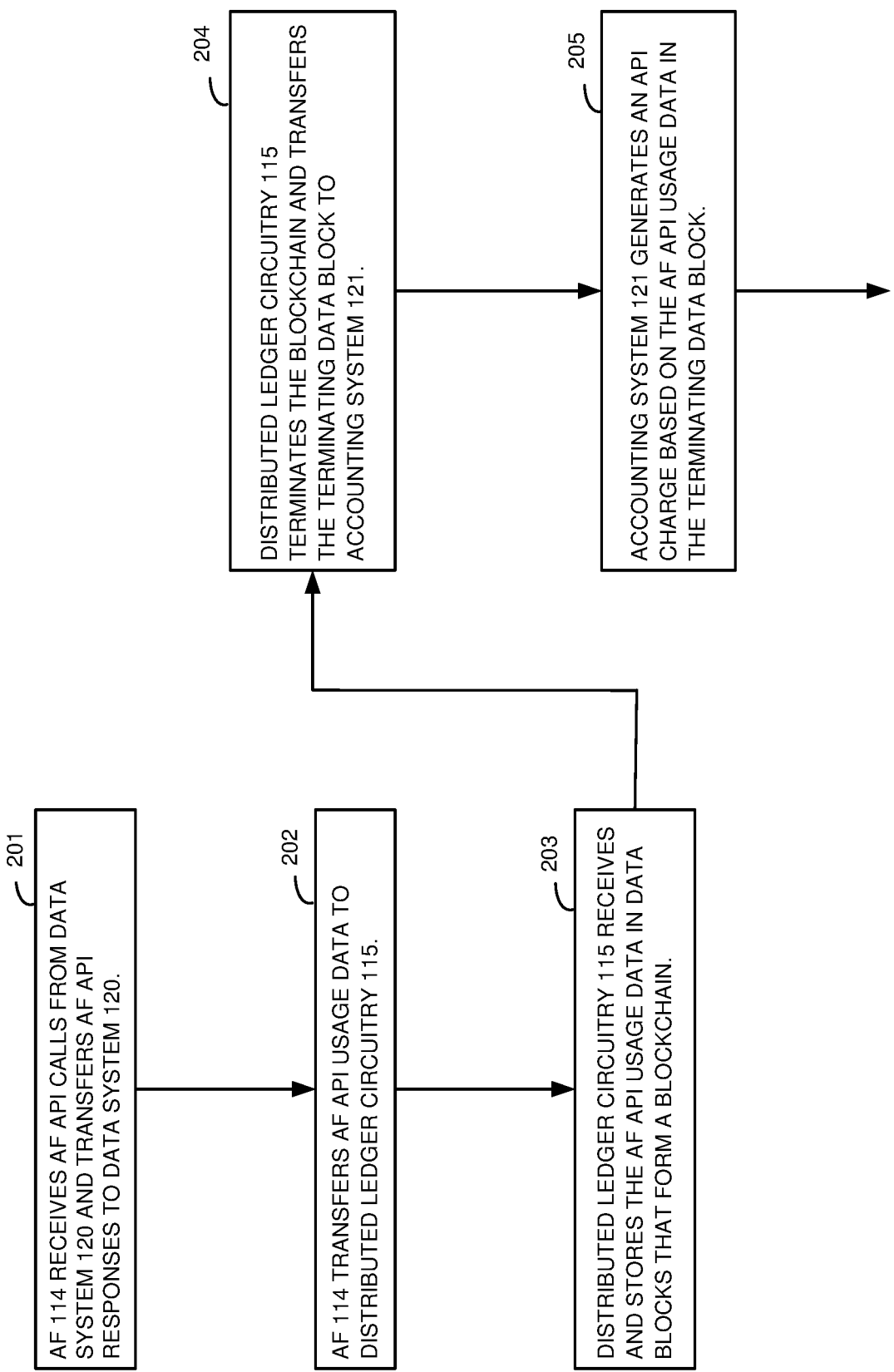
FIG. 2 illustrates an exemplary operation of the wireless communication network to serve the wireless UEs over the API and the distributed ledger.

FIG. 2 illustrates an exemplary operation of wireless communication network 100 to serve wireless UEs 101-103 over the API and distributed ledger circuitry 115. The operation may vary in other examples. AF 114 receives AF API calls from data system 120 and transfers AF API responses to data system 120 (201). AF 114 transfers AF API usage data to distributed ledger circuitry 115 (202). Distributed ledger circuitry 115 receives and stores the AF API usage data in data blocks that form a blockchain (203). Distributed ledger circuitry 115 terminates the blockchain and transfers the terminating data block to accounting system 121 (204). Accounting system 121 generates an API charge based on the AF API usage data in the terminating data block (205).

Figure 3:
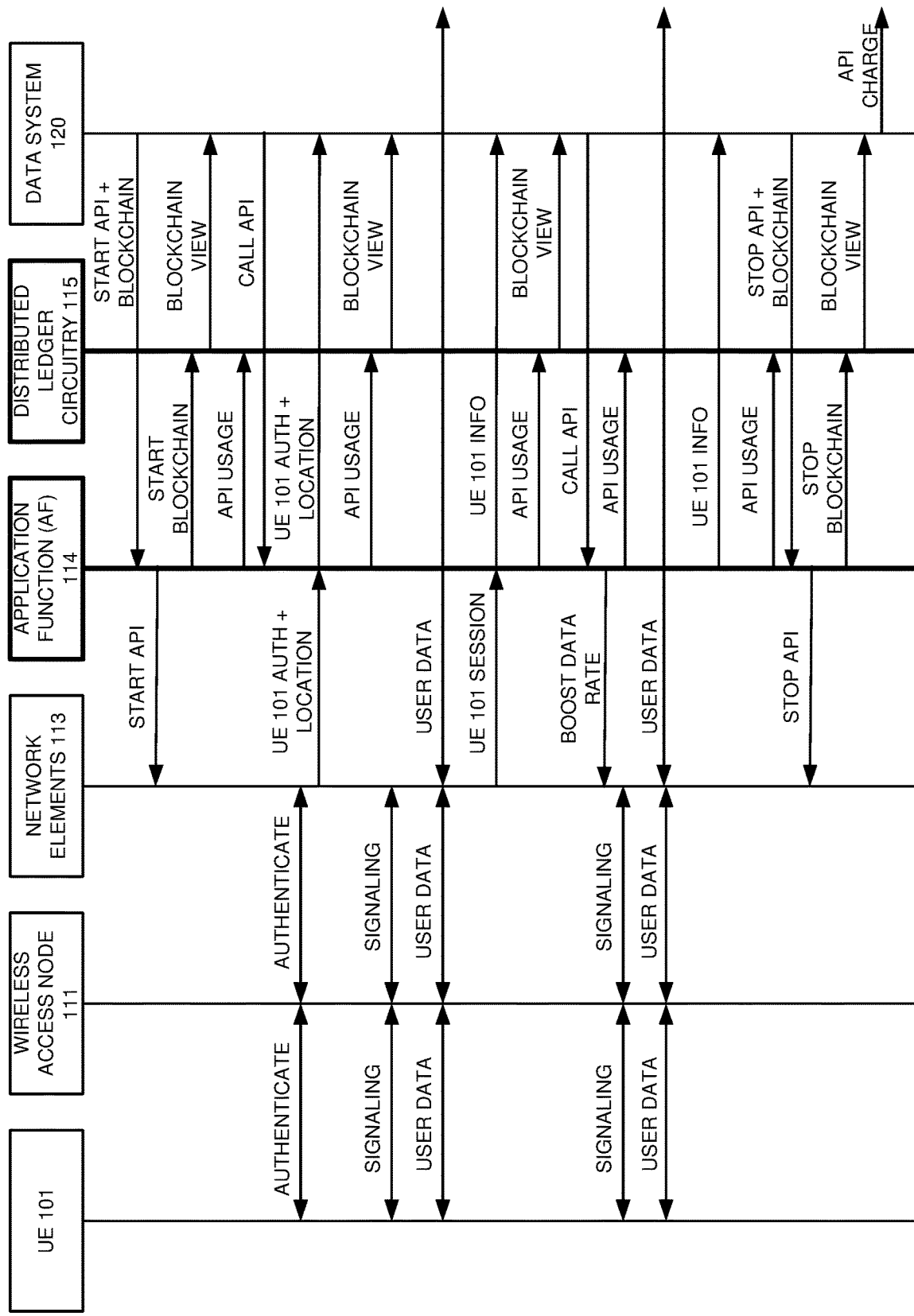
FIG. 3 illustrates an exemplary operation of the wireless communication network to serve the wireless UEs over the API and the distributed ledger.

FIG. 3 illustrates an exemplary operation of wireless communication network 100 to serve wireless UEs 101-103 over the API and distributed ledger circuitry 115. The operation may vary in other examples. Data system 120 instructs AF 114 to start the API and its blockchain for UE 101—perhaps in response to a user menu. AF 114 signals network elements 113 to use serve the API. AF 114 signals distributed ledger circuitry 115 to start a blockchain for the API. AF 114 transfers API usage data (API origination information) to distributed ledger circuitry 115 for the API blockchain. Distributed ledger circuitry 115 presents a view of the blockchain to data system 120. Data system 120 may now call the API on AF 114 to get UE 101 information.

UE 101 authenticates itself by proving its identity to network elements 113 over wireless access node 111. In response to the AF subscription for UE 101 information, network elements 113 transfer the authentication information and geographic location for UE 101 to AF 114. In response to the API call for UE 101 from data system 120, AF 114 transfers the authentication information and geographic location for UE 101 to data system 120. In response to the API usage, AF 114 transfers API usage data to distributed ledger circuitry 115 for the API blockchain. Distributed ledger circuitry 115 continues to present the view of the API blockchain to data system 120.

UE 101 exchanges network signaling with network elements 113 over wireless access node 111. In response to the network signaling, UE 101 exchanges user data with external systems over wireless access node 111 and network elements 113. In response to the AF subscription for UE 101 information, network elements 111 transfer data session information like data rate, amount, and time for UE 101 to AF 114. In response to the API call from data system 120, AF 114 transfers the session information for UE 101 to data system 120. AF 114 transfers corresponding API usage data to distributed ledger circuitry 115 for the API blockchain. Distributed ledger circuitry 115 continues to present the view of the blockchain to data system 120.

Data system 120 calls the API on AF 114 to boost the data rate. AF 114 signals network elements 113 to boost the data rate. UE 101 wireless access node 111 and network elements 113 exchange network signaling to implement the data rate boost. Using the boosted data rate, UE 101 exchanges user data with external systems over wireless access node 111 and network elements 113. In response to the AF subscription for UE 101 information, network elements transfer the data boost information for UE 101 to AF 114. In response to the API call from data system 120, AF 114 transfers the data boost information for UE 101 to data system 120. AF 114 transfers API usage data to distributed ledger circuitry 115 for the API blockchain. Distributed ledger circuitry 115 presents the view of the blockchain to data system 120.

Data system 120 instructs AF 114 to stop the API and its blockchain for UE 101. AF 114 signals network elements 113 to stop the API. AF 114 signals distributed ledger circuitry 115 to stop the blockchain for the API. AF 114 transfers API usage data (API termination information) to distributed ledger circuitry 115 for the API blockchain. Distributed ledger circuitry 115 presents a view of the terminated blockchain to data system 120. Data system 120 (and/or accounting system 121) may read the last block of the blockchain and use the API usage data from the last block to generate or confirm the monetary charge for the API.

Figure 4:
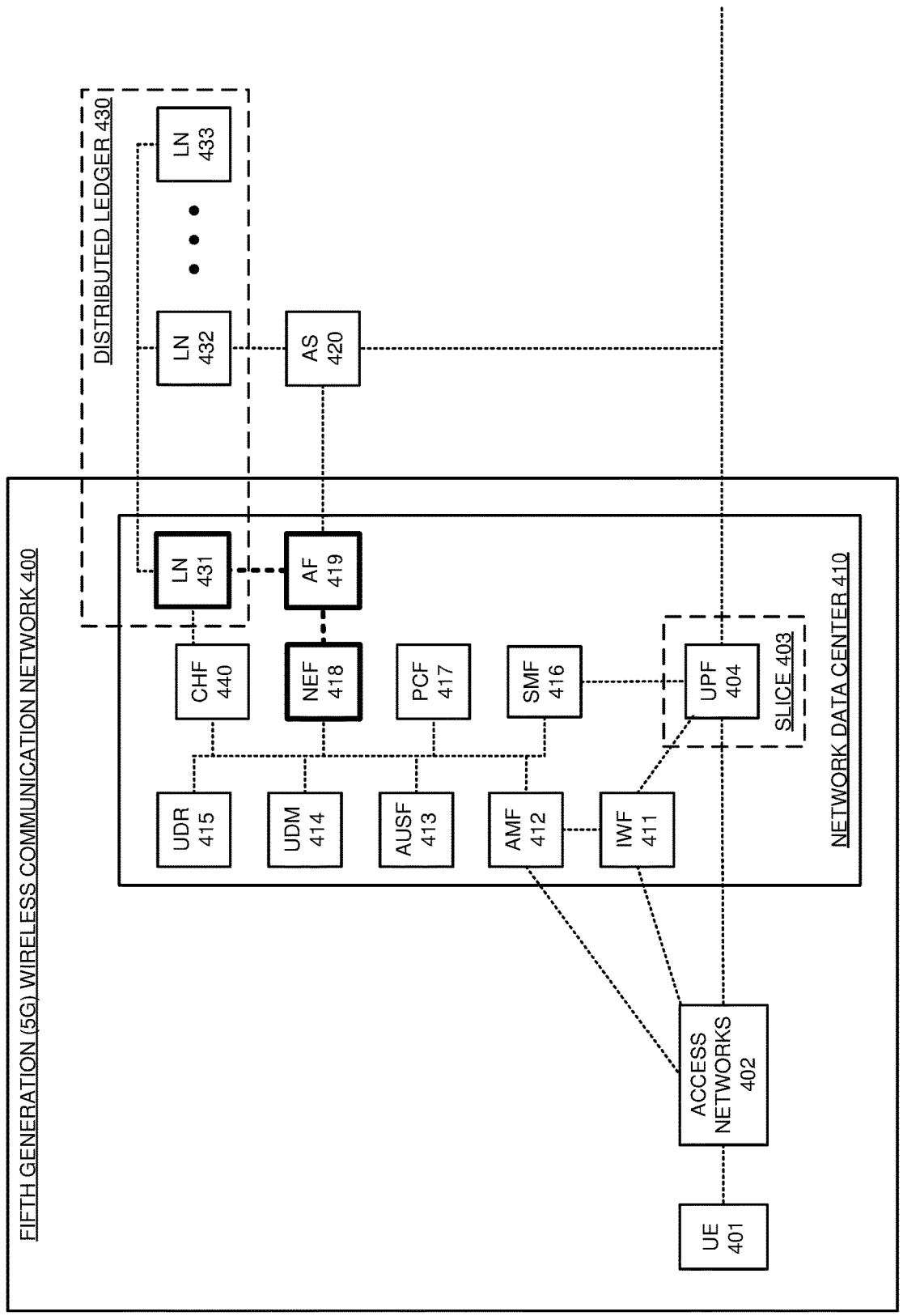
FIG. 4 illustrates an exemplary Fifth Generation (5G) wireless communication network to serve wireless UEs over APIs and distributed ledgers.

FIG. 4 illustrates exemplary Fifth Generation (5G) wireless communication network 400 to serve wireless UE 401 over an API and distributed ledger 430. 5G wireless communication network 400 comprises an example of wireless communication network 100, although network 100 may differ. 5G wireless communication network 400 comprises: UE 401, wireless access networks 402, and network data center 410. Network data center 410 comprises wireless network slice 403, non-Third Generation Partnership Project (non-3GPP) Interworking Function (IWF) 411, Access and Mobility Management Function (AMF) 412, Authentication and Security Function (AUSF) 413, User Data Management (UDM) 414, Unified Data Repository (UDR) 415, Session Management Function (SMF) 416, Policy Control Function (PCF) 417, Network Exposure Function (NEF) 418, Application Function (AF) 419, Ledger Node (LN) 431, and Charging Function (CHF) 440. Wireless network slice 403 comprises User Plane Function (UPF) 404. Distributed ledger 430 comprises LNs 431-433. LN 431 is linked to AF 419, CHF 440, and LNs 432-433. AF 419 is linked to NEF 418, LN 431, and Application Server (AS) 420. AS 420 is linked to AF 419, LN 432, and UPF 404.

NEF 418 exposes NEF APIs for UE 401 and other network products to AF 419. AF 419 exposes corresponding AF APIs for UE 401 and the other network products to AS 420. The APIs comprise calls and responses for UE location, UE authentication, UE data rate increase, UE data rate decrease, and/or the like. In response to the exposed APIs, AS 420 calls an API for UE 401 information which characterizes UE authentication, location, data transfers, and the like. The API call includes a request for a shared blockchain for API usage data. In response to the API call from AS 420, AF 419 directs LN 431 to launch a blockchain for the API data, and LNs 431-433 establish the blockchain for the API. AS 420 may view the blockchain through LN 432. In response to the API call from AS 420, AF 419 calls a corresponding NEF API for UE 401 information on NEF 418. NEF 418 subscribes to UE 401 information from AMF 412.

UE 401 registers with IWF 411 over access networks 402 using WIFI, ENET, or the like. UE 401 authenticates with AMF 412 over access networks 402. To authenticate UE 401, AMF 412 interacts with AUSF 413 which interacts with UDM 414. UDM 414 retrieves a secret identity code for UE 401 from UDR 415 and hashes the secret identity code with a random number to generate an authentication result. UDM 414 transfers the random number and the authentication result to AUSF 413. AUSF 413 transfers the random number and result to AMF 412. AMF 412 transfers the random number to UE 401 over IWF 411 and access networks 402. UE 401 hashes its own copy of the secret identity code with the random number to generate the same authentication result. UE 401 transfers the authentication result to AMF 412 which matches the two authentication results to authenticate UE 401. AMF 412 authorizes a default bearer over slice 403 between UE 401 and AS 420. AMF 412 signals SMF 416 and IWF 411 to serve the default bearer. SMF 416 signals UPF 404 to serve the default bearer. AMF 412 indicates successful authentication and default bearer status to NEF 418 responsive to the subscription. NEF 418 indicates successful authentication and default bearer status to AF 419 responsive to the NEF API call. AF 419 indicates successful authentication and default bearer status to AS 420 responsive to the AF API call. AF 419 indicates the API usage to LN 431, and LNs 431-433 commit the API usage data to the API blockchain. AS 420 may view the blockchain over LN 432. AS 420 and UE 401 may exchange user data over access networks 402, IWF 411, and UPF 404.

AS 420 calls the AF API on AF 419 to boost an uplink for UE 401. AF 419 receives the AF API call and calls a corresponding API on NEF 419. NEF 419 signals PCF 417 to boost the uplink data rate for UE 401, and PCF 417 signals AMF 412 to boost the uplink data rate for UE 401. AMF 412 signals UE 401, IWF 411, and SMF 416 to boost the uplink data rate for UE 401. SMF 416 signals UPF 404 to boost the uplink data rate for UE 401. UE 401 transfers a large data batch to AS 420 over the boosted uplink that traverses access networks 402, IWF 411, and UPF 404. AMF 412 indicates the successful uplink boost to NEF 418 responsive to the subscription. NEF 418 indicates the successful uplink boost to AF 419 responsive to the NEF API call. AF 419 indicates the successful uplink boost to AS 420 responsive to the AF API call. AF 419 indicates the API usage to LN 431, and LNs 431-433 commit the API usage data to the API blockchain. AS 420 may view the blockchain over LN 432.

AS 420 calls the AF API on AF 419 to terminate the API and blockchain for UE 401. AF 419 receives the AF API call and calls a corresponding API on NEF 419. NEF 419 cancels its subscription for UE 401 information from AMF 412. AMF 412 indicates the successful subscription termination to NEF 418. NEF 418 indicates the successful API termination to AF 419 responsive to the NEF API call. AF 419 indicates the successful API termination to AS 420 responsive to the AF API call. AF 419 indicates the final API usage to LN 431 with instructions to terminate the blockchain. LNs 431-433 commit the final API usage data to the API blockchain. In response to the blockchain termination, LN 431 decodes the hash in the last block of the block chain and transfers the API usage data from the last block (including the hash) to CHF 440. CHF 440 processes the API usage data from SMF 416 to generate a charge for the API usage. CHF 440 also processes the API usage data from LN 431 to generate a charge for the API usage.

Figure 5:
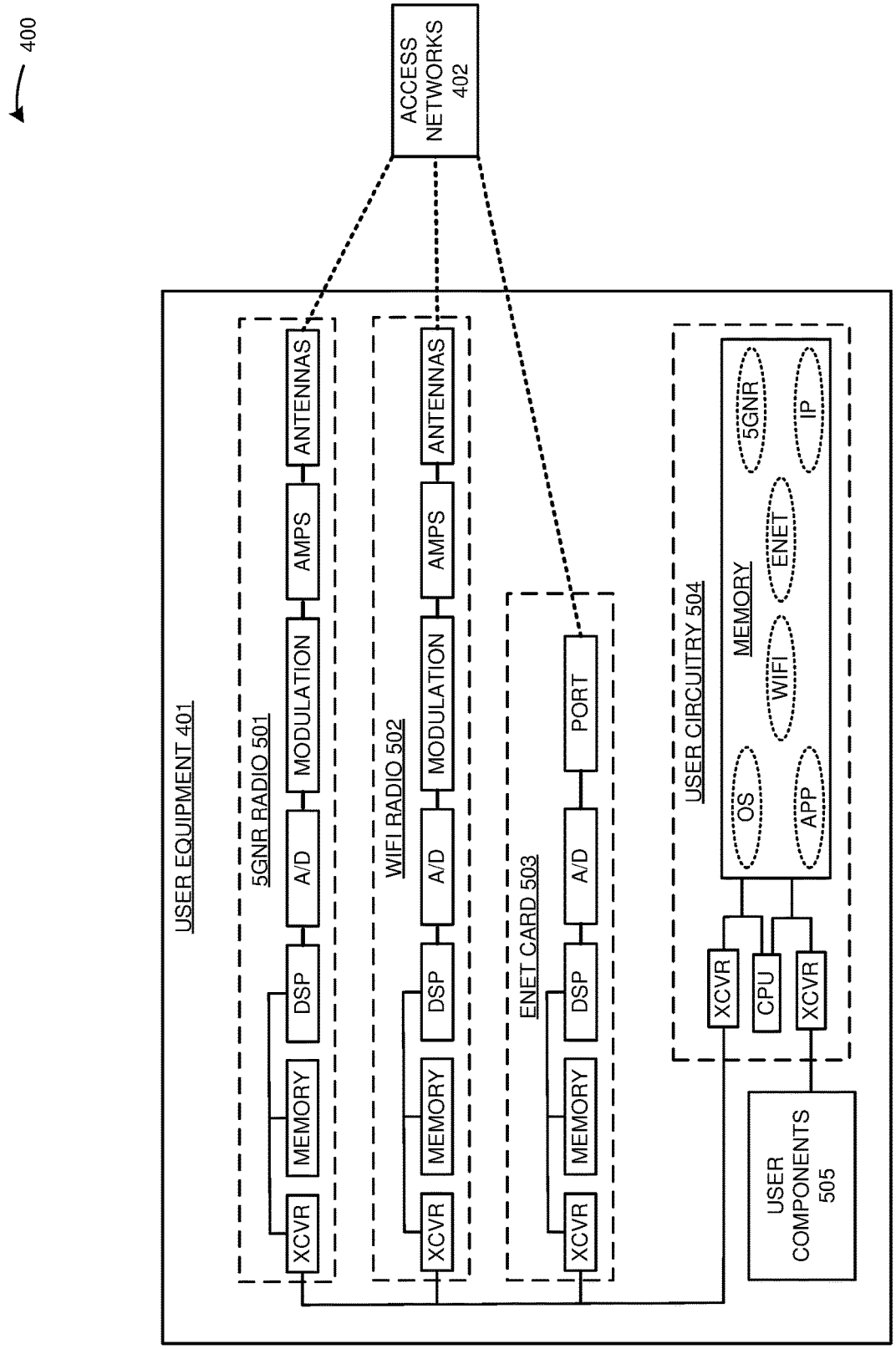
FIG. 5 illustrates an exemplary UE in the 5G wireless communication network.

FIG. 5 illustrates exemplary UE 401 in 5G wireless communication network 400. UE 401 comprises an example of UEs 101-103, although UEs 101-103 may differ. UE 401 comprises 5GNR radio 501, WIFI radio 502, Ethernet (ENET) card 503, user circuitry 504, and user components 505. User components 505 comprise sensors, controllers, displays, or some other user apparatus that generates slice data. Radios 501-502 comprise antennas, amplifiers, filters, modulation, analog-to-digital interfaces, DSP, memory, and transceivers that are coupled over bus circuitry. ENET card 503 comprises ports, analog-to-digital interfaces, DSP, memory, and transceivers that are coupled over bus circuitry. User circuitry 504 comprises memory, CPU, user interfaces and components, and transceivers that are coupled over bus circuitry. The memory in user circuitry 504 stores an operating system (OS), user applications (APP), and network applications for WIFI, ENET, 5GNR, and IP. The antennas in 5GNR radio 501 are wirelessly coupled to access networks 402 over a 5GNR link. The antennas in WIFI radio 502 are wirelessly coupled to access networks 402 over a WIFI link. The port in ENET card 503 is wireline coupled to access networks 402 over an Ethernet link. Transceivers (XCVRs) in radios 501-502 and card 503 are coupled to transceivers in user circuitry 504. Transceivers in user circuitry 504 are coupled to user components 505. The CPU in user circuitry 504 executes the operating system, user applications, and network applications to exchange network signaling and user data with access networks 402 over radios 501-502 and/or card 503. In some examples, some of the 5GNR, WIFI, and ENET components could be omitted. For example, the 5GNR and ENET portions could be omitted to form a WIFI-only UE. The 5GNR and WIFI portions could be omitted to form an ENET-only UE. The WIFI and ENET portions could be omitted to form a 5GNR-only UE. Other device combinations could be used like 5GNR/WIFI, 5GNR/ENET, and WIFI/ENET. Other network communication interfaces could be used like LP-WAN and LTE.

Figure 6:
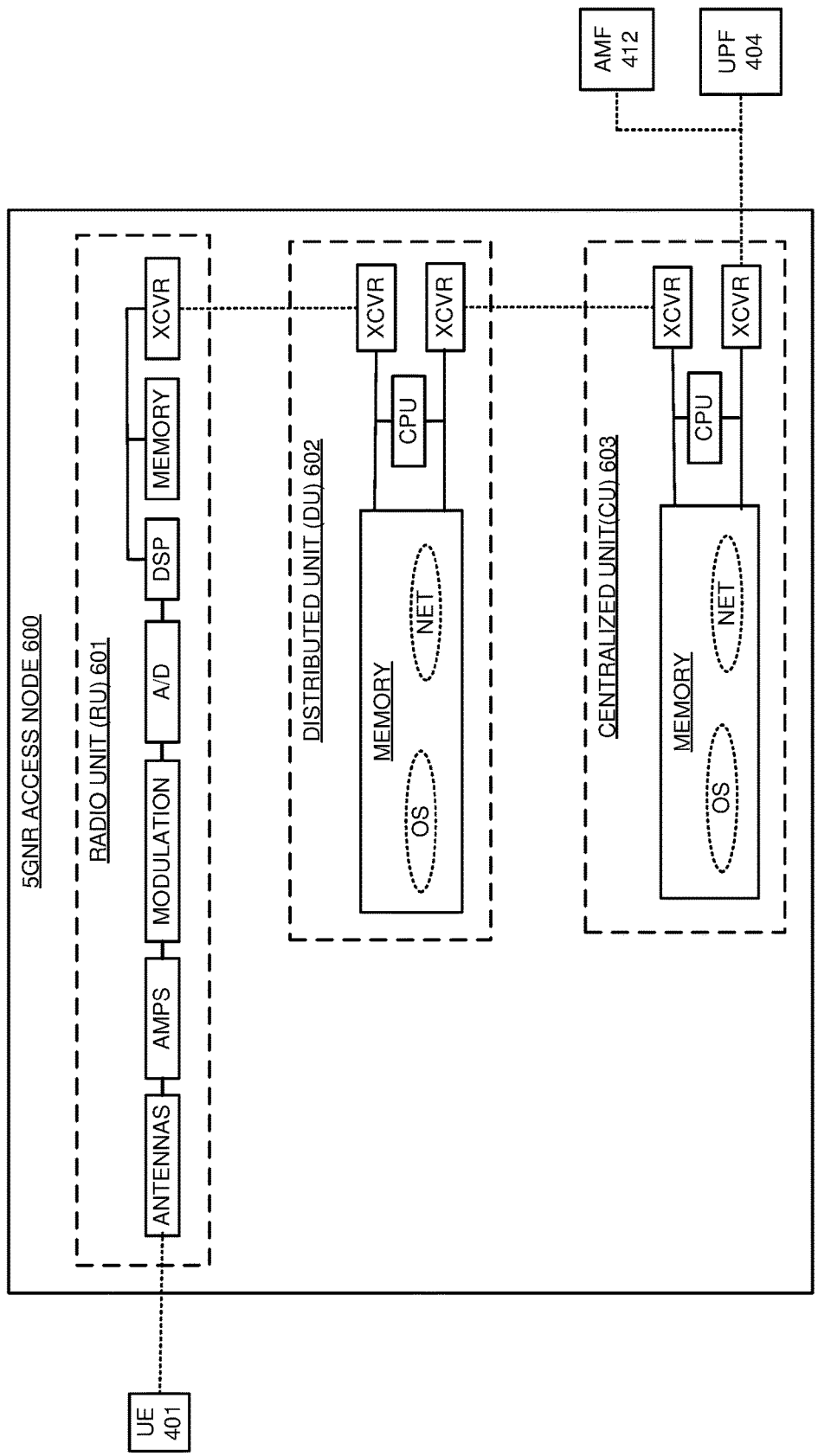
FIG. 6 illustrates an exemplary 5G New Radio (5GNR) access node in the 5G wireless communication network.

FIG. 6 illustrates exemplary 5G New Radio (5GNR) access node 600 in 5G wireless communication network 400. 5GNR access node 600 comprises an example of wireless access node 111 and access networks 402, although node 111 and networks 402 may differ. 5GNR access node 600 comprises Radio Unit (RU) 601, Distributed Unit (DU) 602, and Centralized Unit (CU) 603. RU 601 comprises 5GNR antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores operating system 604 and network applications for physical layer, media access control, and radio link control. CU 603 comprises memory, CPU, user interfaces and components, and transceivers that are coupled over bus circuitry. The memory in CU 603 stores an operating system and network applications for packet data convergence protocol, service data adaption protocol, and radio resource control. The antennas in RU 601 are wirelessly coupled to UE 401 over 5GNR links. Transceivers in RU 601 are coupled to transceivers in DU 602. Transceivers in DU 602 are coupled to transceivers in CU 603. Transceivers in CU 603 are coupled to AMF 415 and UPFs 413-414. The DSP and CPU in RU 601, DU 602, and CU 603 execute radio applications, operating systems, and network applications to exchange network signaling and user data with UE 401, AMF 412, and UPF 404.

Figure 7:
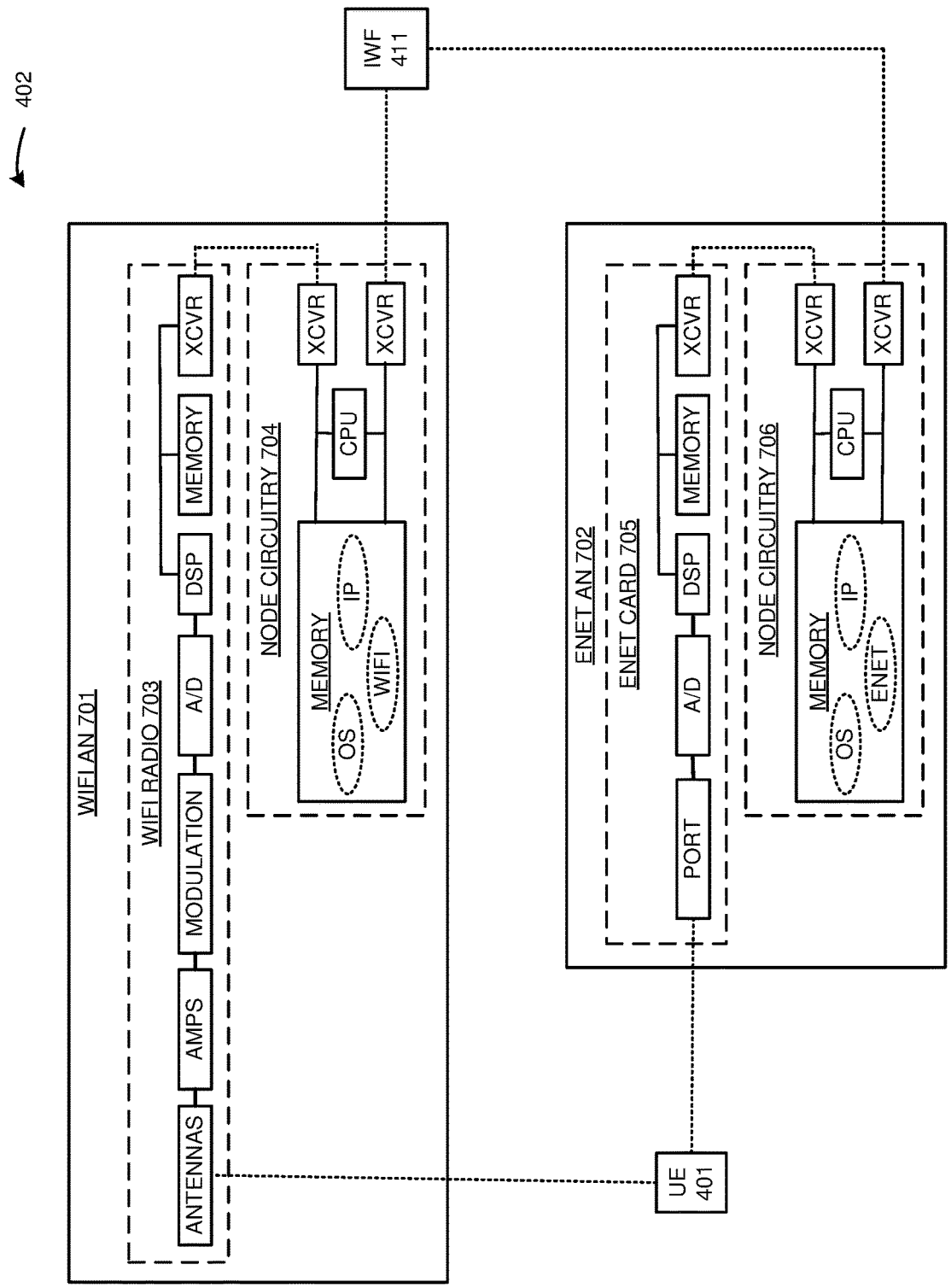
FIG. 7 illustrates exemplary non-3GPP access nodes in the 5G wireless communication network.

FIG. 7 illustrates exemplary non-3GPP access nodes 701-702 in 5G wireless communication network 400. Non-3GPP access nodes 701-702 comprise examples of access node 111 and access networks 402, although node 111 and networks 402 may differ. WIFI AN 701 comprises WIFI radio 703 and node circuitry 704. WIFI radio 703 comprises antennas, amplifiers, filters, modulation, analog-to-digital interfaces, DSP, memory, and transceivers that are coupled over bus circuitry. Node circuitry 704 comprises memory, CPU, user interfaces and components, and transceivers that are coupled over bus circuitry. The memory in node circuitry 704 stores an operating system and network applications for IP and WIFI. The antennas in WIFI radio 704 are wirelessly coupled to UE 401 over a WIFI link. Transceivers in WIFI radio 703 are coupled to transceivers in node circuitry 704. Transceivers in node circuitry 704 are coupled to transceivers in IWF 411. The CPU in node circuitry 704 executes the operating system and network applications to exchange network signaling and user data with UE 401 and with IWF 411.

ENET AN 702 comprises ENET card 705 and node circuitry 706. ENET card 705 comprises ports, analog-to-digital interfaces, DSP, memory, and transceivers that are coupled over bus circuitry. Node circuitry 706 comprises memory, CPU, user interfaces and components, and transceivers that are coupled over bus circuitry. The memory in node circuitry 706 stores an operating system and network applications for IP and ENET. The ports in ENET card 705 are wireline coupled to UE 401 over an ENET link. Transceivers in ENET card 705 are coupled to transceivers in node circuitry 706. Transceivers in node circuitry 706 are coupled to transceivers in IWF 411. The CPU in node circuitry 706 executes the operating system and network applications to exchange network signaling and user data with UE 401 and with IWF 411.

Figure 8:
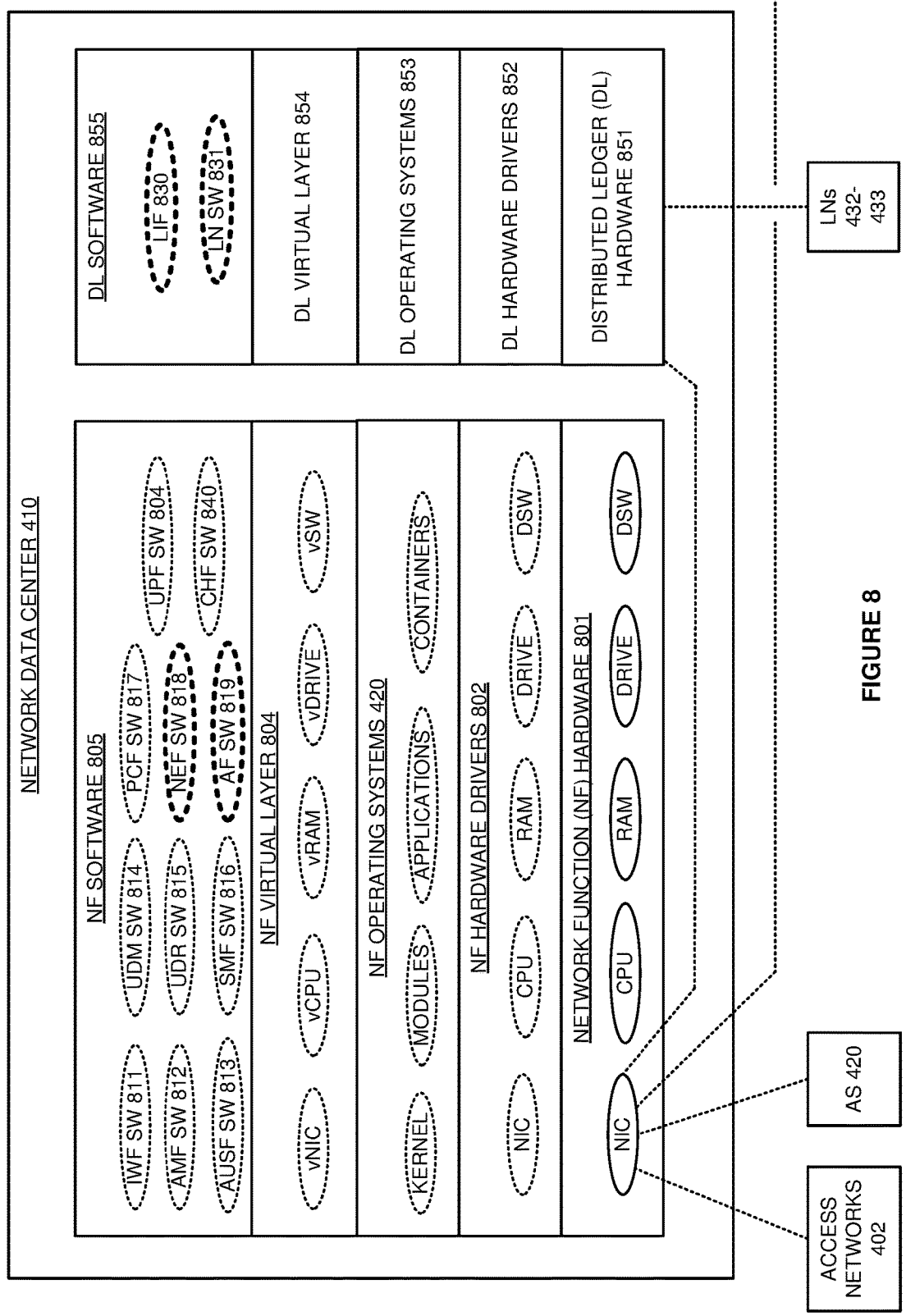
FIG. 8 illustrates an exemplary network data center in the 5G wireless communication network.

FIG. 8 illustrates exemplary network data center 410 in 5G wireless communication network 400. Network data center 410 comprises an example of wireless network circuitry 112 and distributed ledger circuitry 115, although circuitries 112 and 115 may differ. Network data center 410 comprises Network Function (NF) hardware 801, NF hardware drivers 802, NF operating systems 803, NF virtual layer 804, and NF Software (SW) 805, Distributed Ledger (DL) hardware 851, DL hardware drivers 852, DL operating systems 420, DL virtual layer 854, and DL SW 855. NF hardware 801 comprises Network Interface Cards (NICs), CPU, RAM, Flash/Disk Drives (DRIVE), and Data Switches (DSW). DL hardware 851 could be similar. NF hardware drivers 802 comprise software that is resident in the NIC, CPU, RAM, DRIVE, and DSW. DL hardware drivers 852 could be similar. NF operating systems 420 comprise kernels, modules, and applications that form containers for virtual layer and NF software execution. DL operating systems 853 could be similar. NF virtual layer 804 comprises vNIC, vCPU, vRAM, vDRIVE, and vSW. DL virtual layer 854 could be similar. NF SW 805 comprises UPF SW 804, IWF SW 811, AMF SW 812, AUSF SW 813, UDM SW 814, UDR SW 815, SMF SW 816, PCF SW 817, NEF SW 818, AF SW 819, and CHF SW 840. Other NFs like Network Repository Function (NRF) are typically present but are omitted for clarity. DL SW 855 comprises Ledger Interface (LIF) SW 830 and Ledger Node (LN) SW 831. Network data center 410 may be located at a single site or be distributed across multiple geographic locations. The NIC in NF hardware 801 are coupled to access networks 402, AS 420, LNs 432-433, Distributed Ledger (DL) hardware 851, and external systems. NF hardware 801 executes NF hardware drivers 802, NF operating systems 803, NF virtual layer 804, and NFs 805 to form and operate UPF 404, IWF 411, AMF 412, AUSF 413, UDM 414, UDR 415, SMF 416, PCF 417, NEF 418, AF 419, and CHF 440. DL hardware 851 executes DL hardware drivers 852, DL operating systems 853, DL virtual layer 854, and DL SW 855 to form and operate LN 431.

Figure 9:
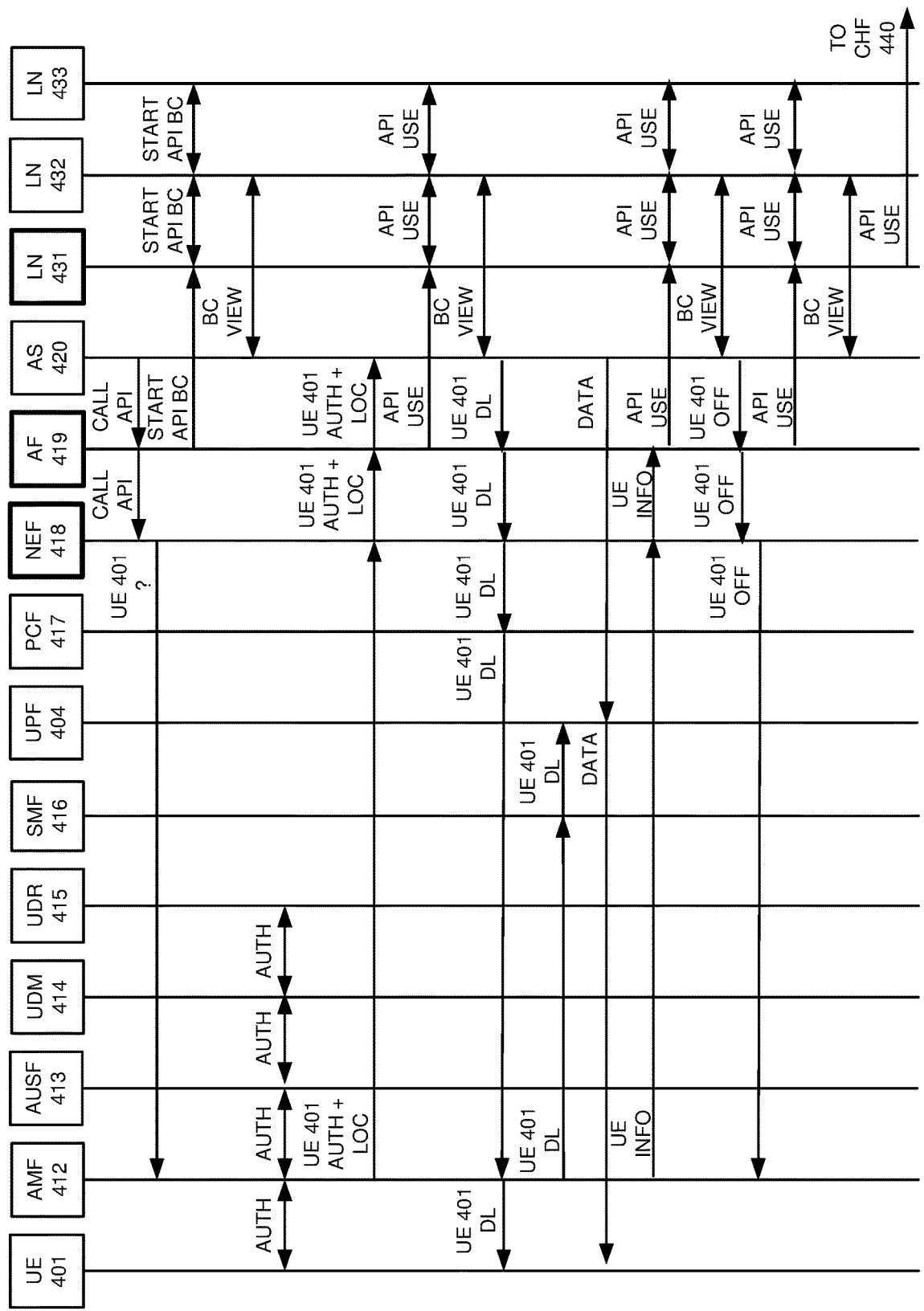
FIG. 9 illustrates an exemplary operation of the 5G wireless communication network to serve the wireless UEs over the APIs and the distributed ledgers.

FIG. 9 illustrates an exemplary operation of 5G wireless communication network 400 to serve wireless UE 401 over the API and distributed ledger 430. The operation may differ in other examples. In response to the exposed APIs, AS 420 calls an API for UE 401 information which characterizes UE authentication, location, data transfers, and the like. The API call includes a request for a shared blockchain for API usage data. In response to the API call from AS 420, AF 419 calls a corresponding NEF API for UE 401 information on NEF 418. NEF 418 subscribes to UE 401 information from AMF 412. In response to the API call from AS 420, AF 419 directs LN 431 to launch a blockchain for the API data, and LNs 431-433 establish the blockchain for the API. AS 420 may view the blockchain through LN 432.

Subsequently, UE 401 wirelessly attaches to 5GNR AN 600 (not shown) and authenticates with AMF 412. AMF 412 interacts with AUSF 413 which interacts with UDM 414 which interacts with UDR 415 as described above (hash the secret identity code with a random number and match authentication results). AMF 412 indicates successful authentication and UE location to NEF 418 responsive to the subscription. NEF 418 indicates successful authentication and location to AF 419 responsive to the NEF API call. AF 419 indicates successful authentication and location to AS 420 responsive to the AF API call. AF 419 indicates the API usage to LN 431, and LNs 431-433 commit the API usage data to the API blockchain. AS 420 may view the blockchain over LN 432.

AS 420 calls the AF API on AF 419 to serve a downlink (DL) for UE 401. AF 419 receives the AF API call and calls a corresponding API on NEF 419. NEF 419 signals PCF 417 to serve the downlink to UE 401. PCF 417 signals AMF 412 to serve the downlink to UE 401. AMF 412 signals UE 401 and SMF 416 (and 5GNR AN 600) to serve the downlink to UE 401. SMF 416 signals UPF 404 to serve the downlink to UE 401. AS 420 transfers large configuration files to UE 401 over the downlink that traverses 5GNR 600 (not shown) and UPF 404. AMF 412 indicates the successful downlink to NEF 418 responsive to the subscription. NEF 418 indicates the successful downlink to AF 419 responsive to the NEF API call. AF 419 indicates the successful downlink to AS 420 responsive to the AF API call. AF 419 indicates the API usage to LN 431, and LNs 431-433 commit the API usage data to the API blockchain. AS 420 may view the blockchain over LN 432.

AS 420 calls the AF API on AF 419 to terminate the API and blockchain for UE 401. AF 419 calls a corresponding API on NEF 419. NEF 419 cancels its subscription for UE 401 information from AMF 412. AMF 412 indicates the successful subscription termination to NEF 418. NEF 418 indicates the successful API termination to AF 419 responsive to the NEF API call. AF 419 indicates the successful API termination to AS 420 responsive to the AF API call. AF 419 indicates the final API usage to LN 431 with instructions to terminate the blockchain. LNs 431-433 commit the final API usage data to the API blockchain. AS 420 may view the blockchain over LN 432. In response to the blockchain termination, LN 431 decodes the hash in the last block of the blockchain and transfers the API usage data from the last block (including the hash) to CHF 440 (not shown), and CHF 440 process the API usage data from LN 431 to generate a charge for the API usage.

The wireless data network circuitry described above comprises computer hardware and software that form special-purpose networking circuitry to serve wireless UEs over APIs and distributed ledgers. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to serve wireless UEs over APIs and distributed ledgers.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to serve a User Equipment (UE) over wireless network circuitry and distributed ledger circuitry, the method comprising:

in the wireless network circuitry, an Application Function (AF) exposing an AF Application Programming Interface (API) for at least one of UE information requesting or UE service modification requesting to an external data system, and in response, receiving AF API calls from the external data system that comprise at least one of UE information requests or UE service modification requests, transferring AF API responses that comprise at least one of UE information indications or UE service modification indications to the external data system, and transferring AF API usage data that characterizes the AF API calls and the AF API responses to distributed ledger circuitry, wherein the AF API and the UE are separate;

the distributed ledger circuitry receiving the AF API usage data and storing the AF API usage data in data blocks that form a blockchain; and the distributed ledger circuitry further terminating the blockchain, and in response, transferring a terminating one of the data blocks for delivery to a network data system that generates an API charge based on the AF API usage data in the terminating one of the data blocks.

2. The method of claim 1 wherein:

the AF transferring the API responses comprises the AF transferring corresponding Network Exposure Function (NEF) API calls that comprise at least one of the UE information requests or the UE service modification requests to a NEF in the network circuitry and receiving corresponding NEF API responses that comprise at least one of the UE information indications or the UE service modification indications from the NEF; and further comprising:

the NEF receiving the corresponding NEF API calls that comprise at least one of the UE information requests or the UE service modification requests, interfacing with one or more network functions in the wireless network circuitry to obtain UE information and/or perform UE service modifications, and transferring the corresponding NEF API responses that comprise at least one of the UE information indications or the UE service modification indications to the AF.

3. The method of claim 2 further comprising:
the AF transferring NEF API usage data that characterizes the NEF API calls and the NEF API responses to the distributed ledger circuitry;
the distributed ledger circuitry receiving the NEF API usage data and storing the NEF API usage data in the data blocks that form the blockchain; and wherein:
the network data system generates the charge amount based on the AF API usage data and the NEF API usage data in the terminating one of the data blocks.

4. The method of claim 1 wherein:
the UE information requests comprise UE location requests;
the UE information indications comprise UE location indications;
the AF API calls comprise the UE location requests; and
the AF API responses comprise the UE location indications.

5. The method of claim 1 wherein:
the UE information requests comprise UE authentication requests;
the UE information indications comprise UE authentication indications;
the AF API calls comprise the UE authentication requests; and
the AF API responses comprise the UE authentication indications.

6. The method of claim 1 wherein:
the UE service modification requests comprise UE data rate increase requests;
the UE service modification indications comprise UE data rate increase indications;
the AF API calls comprise the UE data rate increase requests; and
the AF API responses comprise the UE data rate increase indications.

7. The method of claim 1 wherein:
the UE service modification requests comprise UE data rate decrease requests;
the UE service modification indications comprise UE data rate decrease indications;
the AF API calls comprise the UE data rate decrease requests; and
the AF API responses comprise the the UE data rate decrease indications.

8. The method of claim 1 wherein:
one of the AF API calls comprises a request to initiate the blockchain;
one of the AF API responses comprises an indication of the initiation of the blockchain; and
the blockchain is exposed to the external data system.

9. The method of claim 1 wherein:
the blockchain is exposed to the external data system;
one of the AF API calls comprises a request to terminate the blockchain; and
one of the AF API responses comprises an indication of the termination of the blockchain.

10. A wireless communication network to serve a User Equipment (UE) over wireless network circuitry and distributed ledger circuitry, the wireless communication network comprising:
wireless network circuitry configured to execute an Application Function (AF);
the AF configured to:
expose an AF Application Programming Interface (API) for at least one of UE information requesting or UE service modification requesting to an external data system, wherein the AF API and the UE are separate;
in response, receive AF API calls that comprise at least one of UE information requests or UE service modification requests from an external data system;
transfer AF API responses that comprise at least one of UE information indications or UE service modification indications to the external data system; and
transfer AF API usage data that characterizes the AF API calls and the AF API responses to distributed ledger circuitry; and
the distributed ledger circuitry configured to:
receive the AF API usage data and store the AF API usage data in data blocks that form a blockchain; and
terminate the blockchain; and
in response, transfer a terminating one of the data blocks for delivery to a network data system that generates an API charge based on the AF API usage data in the terminating one of the data blocks.

11. The wireless communication network of claim 10 further comprising a Network Exposure Function (NEF); and wherein:
the wireless network circuitry is further configured to execute the NEF; and
the AF is further configured to:
transfer corresponding NEF API calls that comprise at least one of the UE information requests or the UE service modification requests to the NEF; and
receive corresponding NEF API responses that comprise at least one of the UE information indications or the UE service modification indications from the NEF.

12. The wireless communication network of claim 11 wherein the NEF is further configured to:
receive the corresponding NEF API calls that comprise at least one of the UE information requests or the UE service modification requests;
interface with one or more network functions in the wireless network circuitry to obtain UE information and/or perform UE service modifications; and
transfer the corresponding NEF API responses that comprise at least one of the UE information indications or the UE service modification indications to the AF.

13. The wireless communication network of claim 12 wherein:
the AF is further configured to transfer NEF API usage data that characterizes the NEF API calls and the NEF API responses to the distributed ledger circuitry; and
the distributed ledger circuitry is further configured to:
receive the NEF API usage data; and
store the NEF API usage data in the data blocks that form the blockchain; and
the network data system generates the charge amount based on the AF API usage data and the NEF API usage data in the terminating one of the data blocks.

14. The wireless communication network of claim 10 wherein:

the UE information requests comprise UE location requests;

the UE information indications comprise UE location indications;

the AF API calls comprise the UE location requests; and the AF API responses comprise the UE location indications.

15. The wireless communication network of claim 10 wherein:

the UE information requests comprise UE authentication requests;

the UE information indications comprise UE authentication indications;

the AF API calls comprise the UE authentication requests; and the AF API responses comprise the UE authentication indications.

16. The wireless communication network of claim 10 wherein:

the UE service modification requests comprise UE data rate increase requests;

the UE service modification indications comprise UE data rate increase indications;

the AF API calls comprise the UE data rate increase requests; and the AF API responses comprise the UE data rate increase indications.

17. The wireless communication network of claim 10 wherein:

the UE service modification requests comprise UE data rate decrease requests;

the UE service modification indications comprise UE data rate decrease indications;

the AF API calls comprise the UE data rate decrease requests; and the AF API responses comprise the UE data rate decrease indications.

18. The wireless communication network of claim 10 wherein:

one of the AF API calls comprises a request to initiate the blockchain;

one of the AF API responses comprises an indication of the initiation of the blockchain; and the blockchain is exposed to the external data system.

19. The wireless communication network of claim 10 wherein:

the blockchain is exposed to the external data system;

one of the AF API calls comprises a request to terminate the blockchain; and one of the AF API responses comprises an indication of the termination of the blockchain.

20. A method of operating a wireless communication network to serve a User Equipment (UE) over wireless network circuitry and distributed ledger circuitry, the method comprising:

in the wireless network circuitry, an Application Function (AF) exposing an AF Application Programming Interface (API) for at least one of UE information requesting or UE service modification requesting to an Application Server (AS), and in response, the AF receiving AF API calls that comprise at least one of UE information requests or UE service modification requests from the AS and transferring corresponding Network Exposure Function (NEF) API calls that comprise at least one of the UE information requests or the UE service modification requests to a NEF in the network circuitry, wherein the AF API and the UE are separate;

the NEF receiving the corresponding NEF API calls from the AF and transferring corresponding NEF API responses that comprise at least one of UE information indications or UE service modification indications to the AF;

the AF further receiving the corresponding NEF API responses that comprise at least one of the UE information indications or the UE service modification indications from the NEF, transferring AF API responses that comprise at least one of the UE information indications or the UE service modification indications to the external data system, and transferring AF API usage data that characterizes the AF API calls and the AF API responses to distributed ledger circuitry;

the distributed ledger circuitry receiving the AF API usage data and storing the AF API usage data in data blocks that form a blockchain; and the distributed ledger circuitry further terminating the blockchain, and in response, transferring a terminating one of the data blocks for delivery to a Charging Function (CHF) in the network circuitry that generates an API charge based on the AF API usage data in the terminating one of the data blocks.

* * * * *